Dec. 12, 1950     J. J. DONOHOE ET AL     2,533,363
HORIZONTALLY SWINGABLE STOOL
Filed April 6, 1946
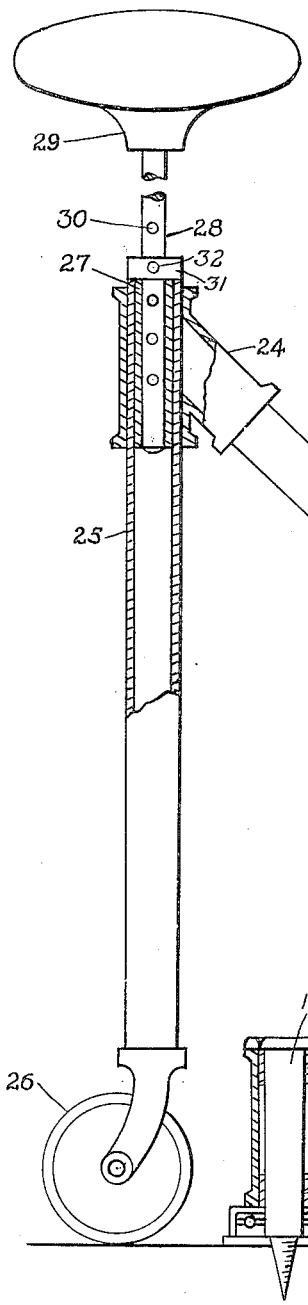
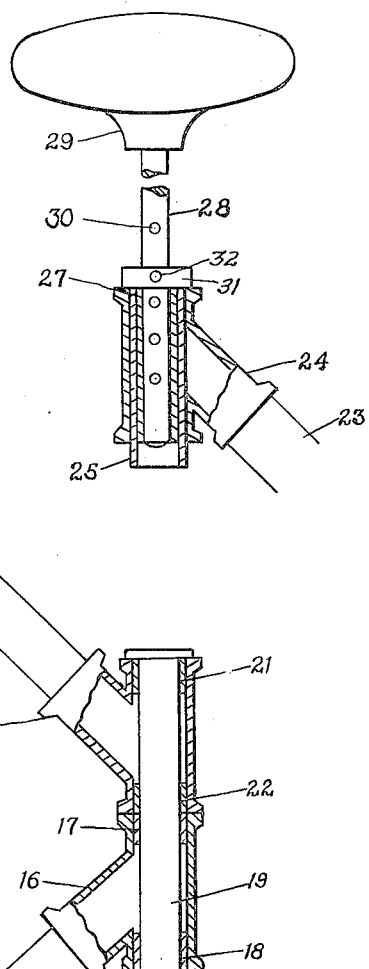

Patented Dec. 12, 1950

2,533,363

UNITED STATES PATENT OFFICE 2,533,363

HORIZONTALLY SWINGABLE STOOL

John J. Donohoe, Bellrose Manor, and Eugene A. Glasser, Kew Gardens, N. Y.

Application April 6, 1946, Serial No. 660,058

4 Claims. (Cl. 155—81)

This invention relates to stools and especially to stools adapted to be adjusted from one operative position to another at the will of the operator.

One object of the invention is the provision of a stool of the type referred to which will enable the operator to sit upon the stool and change from one operative position to another with respect to his work.

Another object of the invention is the provision of a stool of this type which may be constructed inexpensively and which will be efficient in operation.

With these and other objects in view, our invention comprises certain combinations and arrangements of parts as will be hereinafter specifically described and particularly pointed out in the appended claims, and illustrated in the accompanying drawings.

In the drawings:

Figure 1 is a side view partially in section of a device or apparatus constructed in accordance with the present invention; and Figure 2 is a view showing an alternative arrangement for supporting the seat.

Referring to the drawing, 10 indicates a vertically disposed pivot pin secured to the floor. A 45° Y branch fitting 11 is journaled about the pivot pin 10 with the branch portion thereof, projecting upwardly and the lower end thereof resting on a ball thrust bearing 12 positioned about the pivot pin 10. The fitting 11 is preferably provided with upper and lower bearing bushing members 13, 14 to prevent wear as the fitting is rotated about the pivot pin 10. A pipe 15 at its lower end, is secured to the upwardly projecting branch portion of the fitting 11. At its upper end, the pipe member 15 is secured to the downwardly projecting branch portion of a second 45° branch fitting 16, the straight or run portion of which is provided with bearing bushings 17, 18 journaled on a vertically disposed pivot pin 19. The straight or run portion of a third 45° branch fitting 20 which is also provided with bearing bushings 21, 22 is journaled about the pivot pin 19 above the second fitting 16 with the branch portion projecting upwardly. A second pipe member 23 at its lower end, is secured to the upwardly projecting branch portion of the third fitting 20. At its upper end, the second pipe member 23 is secured to the downwardly projecting branch portion of a fourth 45° Y branch fitting 24. Within the straight of run portion of the fourth fitting 24 there is slidably mounted at its upper end a vertically disposed pipe member 25. At its lower end, the pipe member 25 carries a castor 26 which rests on the floor. At its upper end, the pipe member 25 is provided with a bearing bushing 27 within which a seat supporting stud 28 is rotatably mounted. At its upper end, the stud 28 is provided with a seat 29 of any desired type. A collar 31 is positioned about the stud 28 and rests on the pipe 25 and on the bushing 27 at the upper ends thereof. Intermediate its ends, the stud 28 is provided with a series of spaced holes 30, and the arrangement of parts is such that the height of the seat 29 may be adjusted by raising or lowering the stud 28 and thereafter supported in position by inserting a pin through a hole 32 in the collar 31 and into one of the holes 30 in the stud 28.

In operation, the seat 29 is adjusted to the proper height in the manner described above. Thereafter, the position of the seat 29 may be adjusted in a horizontal plane by swinging the lowermost Y branch fitting 11 about its pivot pin 10, and/or by swinging the two intermediate Y branch fittings 16, 20 about their pivot pin 19. The force necessary for obtaining these swinging or rotating movements may be effected by the operator simply by shifting his weight or by pushing his feet against the floor and/or by pushing or pulling with his hands.

In the event that only the lowermost fitting 11 swings about its pivot 10, the seat 29 will travel in a circular path having a radius equal to the distance between the vertical center lines through the pivot 10 and the seat supporting stud 28. The radius of the smallest circular path thus possible for the seat 29 to move through, is the distance between the two above mentioned vertical straight lines when the upper angularly disposed pipe member 23 is positioned directly above the lower angularly disposed pipe member 15. On the other hand, the radius of the largest circular path through which the seat 29 may be thus moved is the distance between the vertical center line through pivot pin 10 and the vertical center line through the seat carrying stud 28 when the two angularly disposed pipe members 15, 23 extend outwardly in the same direction and in the same plane. As either of the two intermediate fittings 16, 20 swing about the pivot pin 19 the distance between the two vertical center lines through pivot pin 10 and the seat carrying stud 28 increases or decreases with the result that by swinging the lowermost fitting 11 about its pivot and the intermediate fittings 16, 20 about the pivot pin 19 the seat 29 may be moved simultaneously in two directions that is to say in a path about pin 10 that may be increased or decreased from one extreme to the other.

The feature of rotatably mounting the seat supporting stud 28 presents the advantage that as the seat 29 is moved from one operative position to another the seat itself can be turned so that if the operator so desires he may always face in the same direction with respect to his work.

By virtue of the fact that the weight of the operator on the seat 29 is supported from the floor through the stud 28, the vertically disposed pipe 25 on which the collar 31 rests and the castor 26 carried by the pipe 25 there is little or no strain on the two main pivot pins 10 and 19. Furthermore, by virtue of the fact that the pipe 25 is slidably mounted in the uppermost Y branch fitting 24 the support for the seat remains ever present even though the floor is uneven and the distance between it and the seat varies as the adjustment of the seat is effected in a horizontal plane.

As stated above, with the arrangement of parts shown, the seat may be moved to any position within an area defined by two circles, one having a radius equal to the distance between a vertical center line through the pivot pin 10 and a vertical center line through the seat supporting stud 28 when the angularly disposed pipe member 23 is positioned directly above the lower angularly disposed pipe member 15 and the other having a radius equal to the distance between a vertical center line through the pivot pin 10 and a vertical center line through the seat supporting stud 28 when the two angularly disposed pipe members 23, 25 extend outwardly and in the same plane. In consequence with this arrangement it is impossible to so move the seat as to bring the center thereof within the area defined by the smaller of the two radii. In the event this is found to be objectionable it may be avoided in a number of ways. For example, as shown in Figure 2, the castor 26 may be omitted, the pipe 25 shortened, the collar 31 enlarged so that it would rest on the fitting 24 at the upper end thereof, and the various parts of the assembly so arranged that a vertical center line would pass through the pivot pin 10 and the seat supporting stud 28.

Having thus described our invention, we claim:

1. An adjustable stool comprising an angularly disposed member having means adapted to be rotatably secured to the floor, a second angularly disposed member connected to said first member, a third angularly disposed member, means rotatably connecting said third member with said second member, a fourth angularly disposed member connected to said third member, and a seat carrying member rotatably mounted in means on said fourth member.

2. An adjustable stool comprising an angularly disposed member having means adapted to be rotatably secured to the floor, a second angularly disposed member connected to said first member, a third angularly disposed member, means rotatably connecting said third member with said second member, a fourth angularly disposed member connected to said third member, a vertically disposed supporting member slidably mounted in said fourth member, a seat secured to said supporting member at the upper end thereof, and a castor secured to said supporting member at the lower end thereof.

3. An adjustable stool comprising an angularly disposed member having means adapted to be rotatably secured to the floor, a second angularly disposed member connected to said first member, a third angularly disposed member, means rotatably connecting said third member with said second member, a fourth angularly disposed member connected to said third member, a vertically disposed supporting member slidably mounted in said fourth member, a castor secured to said supporting member at the lower end thereof, a bushing disposed within said supporting member at the upper end thereof, a vertically disposed supporting stud rotatably mounted in said bushing, and a seat carried by said stud at the upper end thereof.

4. An adjustable stool comprising an angularly disposed member having means adapted to be rotatably secured to the floor, a second angularly disposed member connected to said first member, a third angularly disposed member, means rotatably connecting said third member with said second member, a fourth angularly disposed member connected to said third member, a vertically disposed supporting member slidably mounted in said fourth member, a castor secured to said supporting member at the lower end thereof, a bushing disposed within said supporting member at the upper end thereof, a vertically disposed supporting stud rotatably and slidably mounted in said bushing, means for supporting said stud in said bushing in different adjusted positions, and a seat carried by said stud at the upper end thereof.

JOHN J. DONOHOE.
EUGENE A. GLASSER.

REFERENCES CITED

The following references are of record in the file of this patent:

UNITED STATES PATENTS

| Number | Name | Date |
|---|---|---|
| 54,713 | Genembre | May 15, 1866 |
| 505,138 | Steese | Sept. 19, 1893 |
| 972,472 | Riebe | Oct. 11, 1910 |
| 1,322,551 | Efaw | Nov. 25, 1919 |
| 1,484,229 | Miles | Feb. 19, 1924 |